United States Patent
Shim et al.

(10) Patent No.: US 9,848,377 B2
(45) Date of Patent: Dec. 19, 2017

(54) COMMUNICATION NETWORK SETTING METHOD OF WIRELESS COMMUNICATION TERMINAL

(71) Applicant: SAMSUNG ELECTRONICS CO., LTD., Suwon-si (KR)

(72) Inventors: Jae Wook Shim, Yongin-si (KR); Ji Hoon Bang, Yongin-si (KR); Yeon Bok Lee, Yongin-si (KR); Ho Yang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 14/647,300

(22) PCT Filed: Nov. 26, 2013

(86) PCT No.: PCT/KR2013/010806
§ 371 (c)(1),
(2) Date: May 26, 2015

(87) PCT Pub. No.: WO2014/081272
PCT Pub. Date: May 30, 2014

(65) Prior Publication Data
US 2015/0305052 A1 Oct. 22, 2015

(30) Foreign Application Priority Data
Nov. 26, 2012 (KR) .................. 10-2012-0134349
Nov. 26, 2013 (KR) .................. 10-2013-0144857

(51) Int. Cl.
*H04W 4/00* (2009.01)
*H04W 48/18* (2009.01)
*H04W 88/06* (2009.01)

(52) U.S. Cl.
CPC .......... *H04W 48/18* (2013.01); *H04W 88/06* (2013.01)

(58) Field of Classification Search
None
See application file for complete search history.

(56) References Cited

U.S. PATENT DOCUMENTS

| | | |
|---|---|---|
| 6,052,600 A | 4/2000 | Fette et al. |
| 6,937,877 B2 | 8/2005 | Davenport |

(Continued)

FOREIGN PATENT DOCUMENTS

| | | |
|---|---|---|
| JP | 2002-199451 A | 7/2002 |
| KR | 10-2006-0036209 A | 4/2006 |

(Continued)

OTHER PUBLICATIONS

International Search Report dated Mar. 31, 2014 in International Application No. PCT/KR2013/010806 (6 pages).

*Primary Examiner* — Zewdu A Beyen
(74) *Attorney, Agent, or Firm* — NSIP Law

(57) ABSTRACT

According to a communication network setting method of a wireless communication terminal, wireless communication can be performed with a communication network by reading in advance features related to a communication standard or a communication provider for recognizing a wireless communication network accessible at a current place, detecting features from a wireless communication signal received at the current place, and then setting a modem in a hardware or software scheme according to the features.

18 Claims, 7 Drawing Sheets

(56) References Cited

U.S. PATENT DOCUMENTS

| | | | | |
|---|---|---|---|---|
| 2008/0165740 A1* | 7/2008 | Bachmann | ......... | H04L 63/0272 370/332 |
| 2008/0181155 A1* | 7/2008 | Sherman | ........... | H04W 52/0229 370/311 |
| 2010/0091657 A1* | 4/2010 | Tsfaty | ............... | H04W 52/0296 370/241 |
| 2010/0309051 A1* | 12/2010 | Moshfeghi | ............ | G01S 5/0236 342/378 |
| 2011/0261796 A1 | 10/2011 | Moeller et al. | | |

FOREIGN PATENT DOCUMENTS

| | | |
|---|---|---|
| KR | 10-0728641 B1 | 6/2007 |
| KR | 10-2009-0052183 A | 5/2009 |
| KR | 10-2010-0066620 A | 6/2010 |
| KR | 10-2010-0104017 A | 9/2010 |
| KR | 10-2011-0069535 A | 6/2011 |
| KR | 10-2011-0078419 A | 7/2011 |
| KR | 10-2011-0094983 A | 8/2011 |
| KR | 10-2011-0128558 A | 11/2011 |
| KR | 10-2012-0073106 A | 7/2012 |

\* cited by examiner

US 9,848,377 B2

COMMUNICATION NETWORK SETTING METHOD OF WIRELESS COMMUNICATION TERMINAL

CROSS-REFERENCE TO RELATED APPLICATIONS

This application is a U.S. National Stage entry (371) of international PCT application PCT/KR2013/010806, filed on Nov. 26, 2013, and claims the benefit under 35 U.S.C. §119(a) of Korean Patent Application No. 10-2012-0134349 filed on Nov. 26, 2012 in the Korean Intellectual Property Office, and Korean Patent Application No. 10-2013-0144857 filed on Nov. 26, 2013 in the Korean Intellectual Property Office, the entire disclosures of which are incorporated herein by reference for all purposes.

TECHNICAL FIELD

Example embodiments relate to a communication network setting method of a wireless communication terminal, and more particularly, to a method of setting a communication network by detecting a feature corresponding to a communication standard and a communication provider in a wireless communication signal received from an external source.

BACKGROUND ART

Currently, wireless communication technology corresponding to various communication standards is being used for voice communication and data communication. In general, a wireless communication terminal may support a plurality of communication standards for wireless communication.

To this end, the wireless communication terminal may include a modem corresponding to each of the communication standards. Here, the modem may be implemented through hardware. In practice, since not all modems are used by the wireless communication terminal for the wireless communication, an unused modem may cause increases in costs, a size, and power consumption of a terminal.

Also, the wireless communication terminal may implement the modem through software. Particularly, the wireless communication terminal may use a single modem to process a mathematical operation corresponding to a plurality of communication standards through one or more processors at a high speed. For example, through the implementing, the wireless communication terminal may control one modem to operate as a modem corresponding to a communication standard of a communication network to be accessed among the plurality of communication standards. In this example, processing of an operation related to a processor of the modem may be appropriately determined based on the number of communication standards need to operate simultaneously with the communication standard for the wireless communication.

When the wireless communication terminal implementing the modem through hardware or software is disposed in a predetermined location, the wireless communication terminal may need to search for an accessible communication network of the corresponding location. Accordingly, there is a desire for a method of enabling the wireless communication terminal supporting the plurality of communication standards, to quickly and accurately search for the communication network without wasting power consumption due to an unnecessary signal processing.

DISCLOSURE OF INVENTION

Technical Solutions

According to an aspect of the present invention, there is provided a communication network setting method performed by a wireless communication terminal, the method including reading a feature of a wireless communication signal related to at least one of a communication standard and a communication provider from a database of the wireless communication terminal, detecting the feature from a wireless communication signal received at a current position of the wireless communication terminal, selecting, when a feature is detected from the wireless communication signal, a communication modem corresponding to the detected feature, and setting a communication network using the selected communication modem.

The reading may include reading a feature of a wireless communication signal including a cyclic prefix, a pilot, or a preamble included in the wireless communication signal based on the communication standard or the communication provider.

The detecting may include detecting a feature having a known common characteristic from the wireless communication signal based on the communication standard or the communication provider.

The detecting may include performing at least one operation among a cross-correlation for detecting a recognized sequence, an auto-correlation for detecting repetitive information, and a frequency conversion for detecting a feature from a frequency domain.

The detecting may include detecting the feature from the wireless communication signal by changing a frequency band or changing a channel included in the frequency band until one of features corresponding to the communication standard or the communication provider read from the database is detected in the wireless communication signal received by the wireless communication terminal.

The detecting may include detecting, when a feature corresponding to the communication standard or the communication provider read from the database is not detected from the wireless communication signal received by the wireless communication terminal, the feature in the wireless communication signal by changing a frequency band or changing a channel included in the frequency band until the feature corresponding to the communication standard or the communication provider is detected, and detecting a feature corresponding to a new communication standard or communication provider when the feature is not detected from all frequency bands.

The selecting may include selecting a communication modem corresponding to the communication standard or the communication provider related to the feature from a plurality of communication modems implemented through hardware, or implementing a communication modem by changing a program through software based on the communication standard or the communication provider related to the feature.

According to another aspect of the present invention, there is also provided a wireless communication terminal performing a communication network setting method, the terminal including a feature detector configured to read a feature of a wireless communication signal related to at least one of a communication standard and a communication provider from a database of the wireless communication terminal, and detect the feature from a wireless communication signal received at a current position of the wireless communication terminal, a modem selector configured to select, when a feature is detected from the wireless communication signal, a communication modem corresponding to the detected feature, and a communication network setter configured to set a communication network using the selected communication modem.

The feature detector may be configured to read a feature of a wireless communication signal including a cyclic prefix, a pilot, or a preamble included in the wireless communication signal based on the communication standard or the communication provider.

The feature detector may be configured to detect a feature having a known common characteristic from the wireless communication signal based on the communication standard or the communication provider.

The feature detector may be configured to perform at least one operation among a cross-correlation for detecting a recognized sequence, an auto-correlation for detecting repetitive information, and a frequency conversion for detecting a feature from a frequency domain.

The feature detector may be configured to detect the feature from the wireless communication signal by changing a frequency band or changing a channel included in the frequency band until one of features corresponding to the communication standard or the communication provider read from the database is detected in the wireless communication signal received by the wireless communication terminal.

When a feature corresponding to the communication standard or the communication provider read from the database is not detected from the wireless communication signal received by the wireless communication terminal, the feature detector may be configured to detect the feature in the wireless communication signal by changing a frequency band or changing a channel included in the frequency band until the feature corresponding to the communication standard or the communication provider is detected, and when the feature is not detected from all frequency bands, the feature detector may be configured to detect a feature corresponding to a new communication standard or communication provider.

The modem selector may be configured to select a communication modem corresponding to the communication standard or the communication provider related to the feature from a plurality of communication modems implemented through hardware, or to implement a communication modem by changing a program through software based on the communication standard or the communication provider related to the feature.

BEST MODE FOR CARRYING OUT THE INVENTION

Hereinafter, example embodiments will be described in detail with reference to the accompanying drawings.

Figure 1:
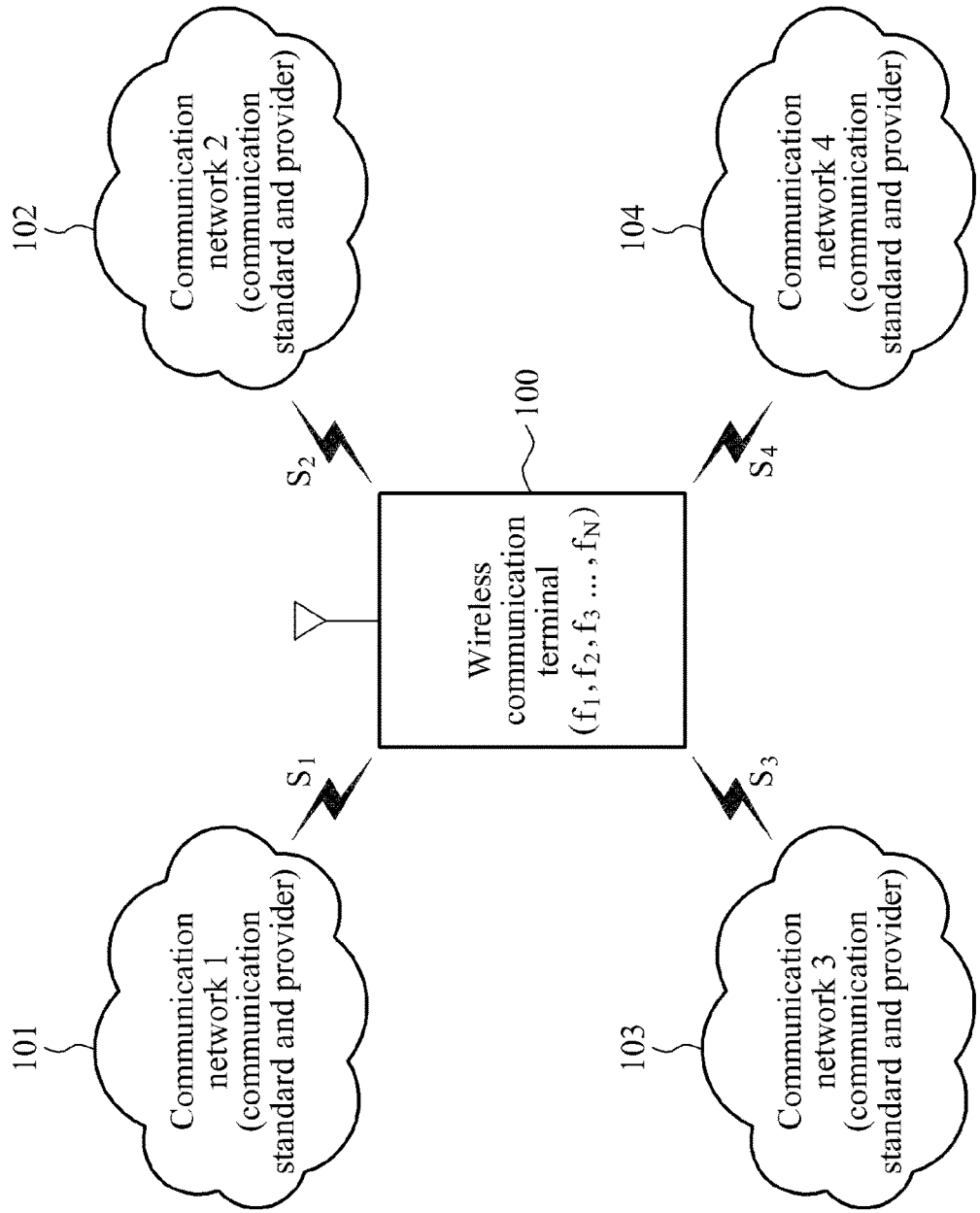
FIG. 1 is a diagram illustrating a communication network setting procedure of a wireless communication terminal according to an example embodiment.

FIG. 1 is a diagram illustrating a communication network setting procedure of a wireless communication terminal according to an example embodiment.

Referring to FIG. 1, a wireless communication terminal 100 may be accessible to a plurality of wireless communication networks, for example, a wireless fidelity (WiFi), a wireless broadband (WiBro), Bluetooth, a second generation (2G) network, a third generation (3G) communication network, and a fourth generation (4G) communication network. To this end, the wireless communication terminal 100 may include a plurality of modems provided in a form of hardware to access the plurality of wireless communication networks. Alternatively, the wireless communication terminal 100 may set, to a single modem, a modem function related to the plurality of wireless communication networks through software so as to access the plurality of communication network using the single modem.

The wireless communication terminal 100 may include, for example, a voice communication radio such as a walkie-talkie, a military-use communication device, a communication device used in transportation such as an airplane, a vehicle, and a sea vessel, and an electronic device such as a cellular phone, a smartphone, and a tablet personal computer (PC).

When a location of the wireless communication terminal 100 is changed through a movement of a user, a wireless communication environment of the wireless communication terminal 100 may be changed. Accordingly, the wireless communication terminal 100 may need to access a communication network different from a communication network to which the wireless communication terminal 100 is currently connected, or perform a hand-over to another communication network.

To this end, the wireless communication terminal 100 may detect communication networks 101 through 104 accessible at a current position. As an example, the wireless communication terminal 100 may store a feature of a wireless communication signal of an accessible communication network in a database and detect the feature of the wireless communication signal, thereby discovering a communication network accessible at the current position. Subsequently, the wireless communication terminal 100 may select a modem in a form of hardware or change a setting of the modem in a form of software, thereby accessing the communication network.

For example, the wireless communication terminal 100 may detect features $f_1$ through $f_N$ stored in the database from a wireless communication signal received at the current position, thereby accessing a communication network capable of transmitting and receiving the corresponding wireless communication signal. In this example, the wireless communication terminal 100 may read one of the features of the wireless communication signal stored in the database, and determine whether a feature read from a wireless communication signal corresponding to a channel of a predetermined frequency band by performing a signal processing.

Here, the feature of the wireless communication signal may be classified into a communication standard and a communication provider. For example, when the communication standard differs, the feature may differ. When the communication provider differs, the feature may also differ although the communication standard is the same.

Figure 2:
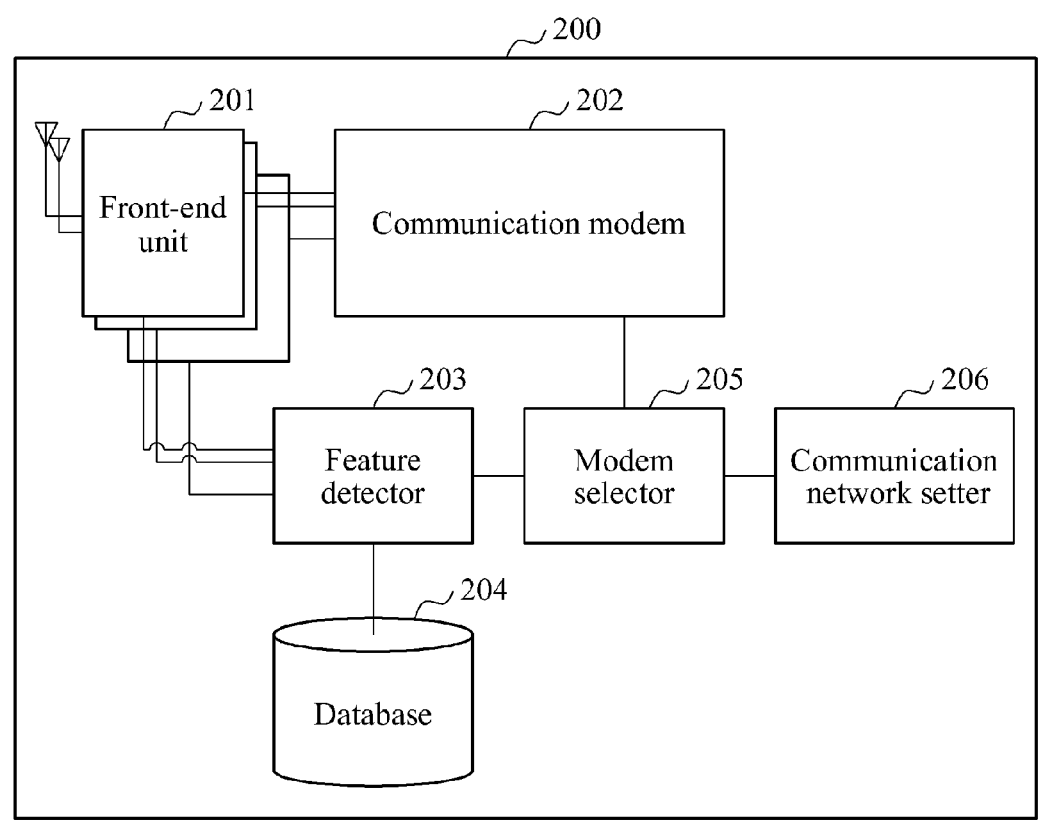
FIG. 2 is a diagram illustrating a configuration of a wireless communication terminal according to an example embodiment.

FIG. 2 is a diagram illustrating a configuration of a wireless communication terminal according to an example embodiment.

Referring to FIG. 2, a wireless communication terminal 200 may include a front-end unit 201, a communication modem 202, a feature detector 203, a database 204, a modem selector 205, and a communication network setter 206.

The front-end unit 201 may receive a wireless communication signal from an external source of the wireless communication terminal 200. The front-end unit 201 may convert the wireless communication signal into a digital signal in response to the receiving. Subsequently, the front-end unit 201 may transfer, to the communication modem 202, the digital signal into which the wireless communication signal is converted. Also, the front-end unit 201 may convert the wireless communication signal transferred from the communication modem 202 into an analog signal, and wirelessly transmit the analog signal using an antenna. Here, the communication modem 202 may be a software modem or a hardware modem corresponding to a plurality of communication standards.

To apply a multiple-input and multiple-output (MIMO) scheme, the number of communication networks allowing a simultaneous access, or a frequency band range of the wireless communication signal to be transmitted and received, the front-end unit 201 may include one or more blocks having similar or identical functions. Each of the blocks may include an antenna.

As an example, the front-end unit 201 may perform a frequency modulation or demodulation based on the communication standard or an implementation scheme to change a frequency of a wireless communication signal to be transmitted or received using an antenna. Also, the front-end unit 201 may be connected to the communication modem 202 processing a digital signal through an analog-to-digital conversion or a digital-to-analog conversion.

The communication modem 202 may restore data transferred using a wireless communication signal to be transmitted by applying a mathematical operation for generating the wireless communication signal to be transmitted, an inverse operation of a mathematical operation with respect to the digitally converted received wireless communication signal, and an error correction. The communication modem 202 may include, for example, a hardware accelerator and a processor designed to perform mathematical operations at a high speed.

As described above, the communication modem 202 may include hardware modems, each corresponding to the plurality of communication standards, or include one software modem of which an internal performing process is to be changed through a programming based on the plurality of communication standards.

Additionally, the communication modem 202 may perform various operations to restore the data by analyzing the received wireless communication signal and generate the wireless communication signal to be transmitted. For example, the communication modem 202 may perform various operations on the wireless communication signal, including encoding/decoding, modulation/demodulation, error correction, conversion between time-frequency domains, scrambling/descrambling, and interleaving/deinterleaving.

To this end, the communication modem 202 may include a combination of hardware elements such as a hardware accelerator, a processor, a data memory, a program memory, and a memory for storing a setting value. The number of hardware elements may differ based on, for example, a communication standard to be implemented in the wireless communication terminal 200, the number of simultaneously operable communication standards, and an operation complexity of an algorithm used for each communication standard.

The feature detector 203 may detect the feature extracted from the database 204, from the received wireless communication signal based on a plurality of feature detecting schemes. As an example, the feature detector 203 may detect a feature of a wireless communication signal matching the communication standard applied to the wireless communication terminal 200. When the feature is detected, the wireless communication terminal 200 may search for a communication network corresponding to the communication standard matching the feature, and access the found communication network. By using the feature detector 203, the wireless communication terminal 200 may search for a communication network accessible at a current position at a high speed and using a low power.

As an example, the feature detector 203 may perform at least one operation for detecting, from the wireless communication signal, a characteristic of a packet or symbol for use in various wireless communications. For example, the feature detector 203 may perform an operation such as a cross-correlation and an auto-correlation. Also, to detect the feature of the wireless communication signal from a frequency domain, the feature detector 203 may perform a Fourier transform for converting a wireless communication signal received in a time domain into a signal of a frequency domain.

Here, the cross-correlation may be applied to detect information determined in advance such as a preamble included in the wireless communication signal. Additionally, the auto-correlation may be applied to, for example, a cyclic prefix of an orthogonal frequency division multiplexing (OFDM) and a preamble having a repetitive pattern, which are repetitively arranged in the wireless communication signal and have a known repetition interval. Also, the feature detector 203 may set a diversified coefficient or timing to detect features of various wireless communication signals.

The feature detector 203 may use a mathematical operation performed by the communication modem 202 to detect the feature of the wireless communication signal. In this example, when the communication modem 202 partially or fully performs a mathematical operation to be performed by the feature detector 203, the modem selector 205 may activate only an operation corresponding to a mathematical operation used in the communication modem 202, thereby optimizing the wireless communication terminal 200 in terms of hardware and minimizing power consumption.

As an example, the feature detector 203 may read features of a wireless communication signal corresponding to a communication standard or a communication provider to be processed by the wireless communication terminal 200, from the database 204 at a time. Subsequently, the feature detector 203 may detect one of the features read from the database 204, from a wireless communication signal received using the front-end unit 201.

When all of the features related to the communication standard or the communication provider are not detected from the wireless communication signal received through a current channel of the frequency band, the feature detector 203 may detect one of features read from a wireless communication signal through another channel. As such, the feature detector 203 may repetitively perform feature detection by changing a channel in the same frequency band until the feature is detected. When all of the features related to the communication standard or the communication provider are not detected through all channels in the same frequency band, the feature detector 203 may detect features in a corresponding wireless communication signal by changing a channel in another frequency band.

As another example, the feature detector 203 may read, from the database 204, a feature of a wireless communication signal corresponding to one of communication standards or communication providers to be processed by the wireless communication terminal 200. Subsequently, the feature detector 203 may detect the feature read from the database 204, from a wireless communication signal received using the front-end unit 201.

When the feature related to the communication standard or the communication provider is not detected from the wireless communication signal through the current channel of the frequency band, the feature detector 203 may detect the feature related to the communication standard from a wireless communication signal received through another channel. As such, the feature detector 203 may repetitively perform feature detection by changing a channel in the same frequency band until the feature is detected. When the feature is not detected through all of the channels in the same frequency band, the feature detector 203 may detect the features in a wireless communication signal of another frequency band.

Also, when the feature is not detected in all frequency bands to be received by the wireless communication terminal, the feature detector 203 may read a feature of a communication signal corresponding to a new communication standard or communication provider and detect the feature in the received wireless communication signal. In this example, a procedure of detecting the feature may start in the frequency band in which the feature is detected at a previous time.

The database 204 may store a feature of a wireless communication signal related to all settable communication networks in the wireless communication terminal 200. For example, the feature may indicate various items of information, for example, a start frequency assigned location, a form of a pilot signal, and a form of a preamble included in the wireless communication signal, used to identify the wireless communication signal.

The database 204 may store, for example, a channel width, a center frequency, and a type of a communication network, as well as the feature. When an accessible communication standard of the wireless communication terminal increases or performance is improved, other items of data may be added to data stored in the database 204 or an update may be performed on the data stored in the database 204.

When the feature detector 203 detects the feature of the wireless communication signal, the modem selector 205 may select a modem for accessing a communication network matching a communication standard corresponding to the detected feature. As describe above, the communication modem 202 may be classified as a hardware modem corresponding to each of the plurality of communication standards, or a software modem programmably changeable such that a plurality of communication standards is applied to a single modem.

In this example, power consumption of the wireless communication terminal 200 may be minimized by inactivating a clock or blocking an unnecessary power source of the communication modem 202 while the wireless communication terminal 200 is searching for a currently accessible communication network by detecting the feature.

The communication network setter 206 may set a communication network allowing an access of the wireless communication terminal 200 at a current position using the selected communication modem. The set communication network may be, for example, a communication network capable of transmitting and receiving the wireless communication signal including the feature detected by the feature detector 203.

Figure 3:
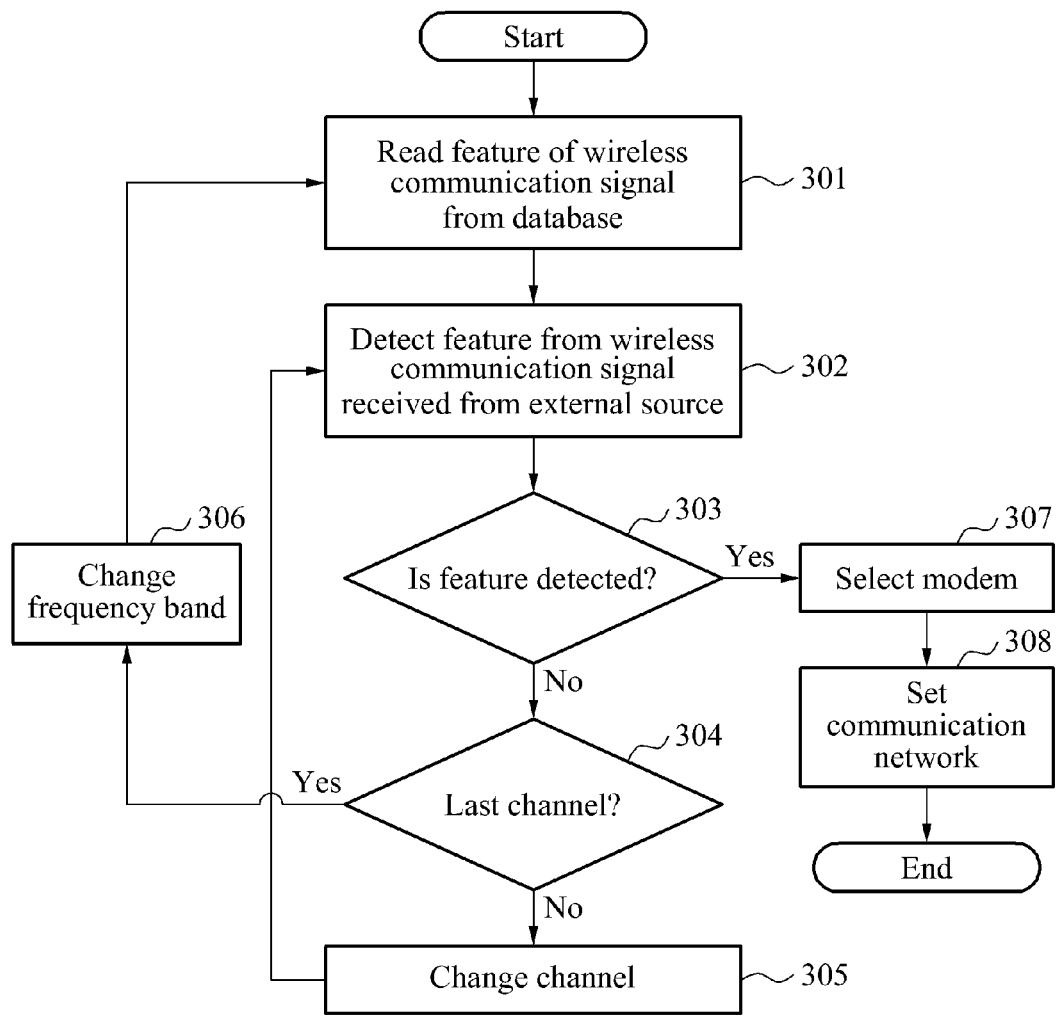
FIG. 3 is a diagram illustrating a communication network setting method of a wireless communication terminal according to an example embodiment.

FIG. 3 is a diagram illustrating a communication network setting method of a wireless communication terminal according to an example embodiment.

The wireless communication terminal may attempt to access a new communication network when communication with a currently connected communication network is not smoothly performed due to a change in a wireless communication environment or a movement of a user. In this example, a modem included in the wireless communication terminal may need to be set based on the new communication network such that the wireless communication terminal is connected to the new communication network. Here, the setting of the modem may indicate generating of a sending signal based on a communication standard related to a communication network, programming of software to perform an operation for analyzing a receiving signal, and selecting a hardware modem or adjusting various parameter values.

Prior to the setting, whether the wireless communication terminal is allowed to access a communication network at a current position may need to be determined. FIG. 3 illustrates a procedure of the wireless communication terminal recognizing a currently accessible communication network using a feature of a wireless communication signal.

In operation 301, the wireless communication terminal may read a feature of a wireless communication signal from a database. In an example, the feature of the wireless communication signal may be differently determined based on at least one of a communication standard and a communication provider. Also, the feature may include information for identifying a wireless communication signal related to a communication standard to be received by the wireless communication terminal.

As an example, the wireless communication terminal may read a plurality of features based on all communication standards or communication providers stored in the database at a time. As another example, the wireless communication terminal may read a feature based on one of communication standards or communication providers stored in the database.

In operation 302, the wireless communication terminal may detect a feature from a wireless communication signal received from an external source. When the plurality of features based on all of the communication standards or communication providers stored in the database is read at a time in operation 301, the wireless communication terminal may detect the read features from one channel included in a frequency band. When the wireless communication terminal fails to detect a feature in a corresponding channel, the wireless communication terminal may repetitively perform feature detection by changing a channel. Also, when the wireless communication terminal fails to detect a feature in all channels of a predetermined frequency band, the wireless communication terminal may repetitively perform the feature detection by changing the frequency band.

Alternatively, when the feature based on one of the communication standards or communication providers stored in the database is read in operation 301, the wireless communication terminal may detect the feature from the received wireless communication signal by changing the channel included in the frequency band or changing the frequency band. In this example, when the feature is not detected in all of the channels and the frequency band, the wireless communication terminal may repetitively perform a procedure of detecting a feature based on a new communication standard or communication provider. For example, the wireless communication terminal may read a feature and detect the read feature from a plurality of channels and frequency bands. Also, when the wireless communication terminal fails to detect a feature, a procedure of reading another feature from a database and detecting the feature may be performed.

In operation 303, the wireless communication terminal may determine whether the feature is detected. When the feature is not detected, the wireless communication terminal may determine whether a current channel receiving the wireless communication signal is a last channel of the frequency band in operation 304.

In this instance, when the current channel is not the last channel, the wireless communication terminal may change a channel from the current channel to another channel in the frequency band in operation 305. In contrast, when the current channel is the last channel, the wireless communication terminal may change the frequency band from a current frequency band to another frequency band in operation 306. Subsequently, in operation 301, the wireless communication terminal may read the feature of the wireless communication signal from the database.

Also, when the feature is detected in operation 303, the wireless communication terminal may select a modem related to a communication standard corresponding to the detected feature in operation 307. Subsequently, in operation 308, the wireless communication terminal may set a communication network using the modem.

Figure 4:
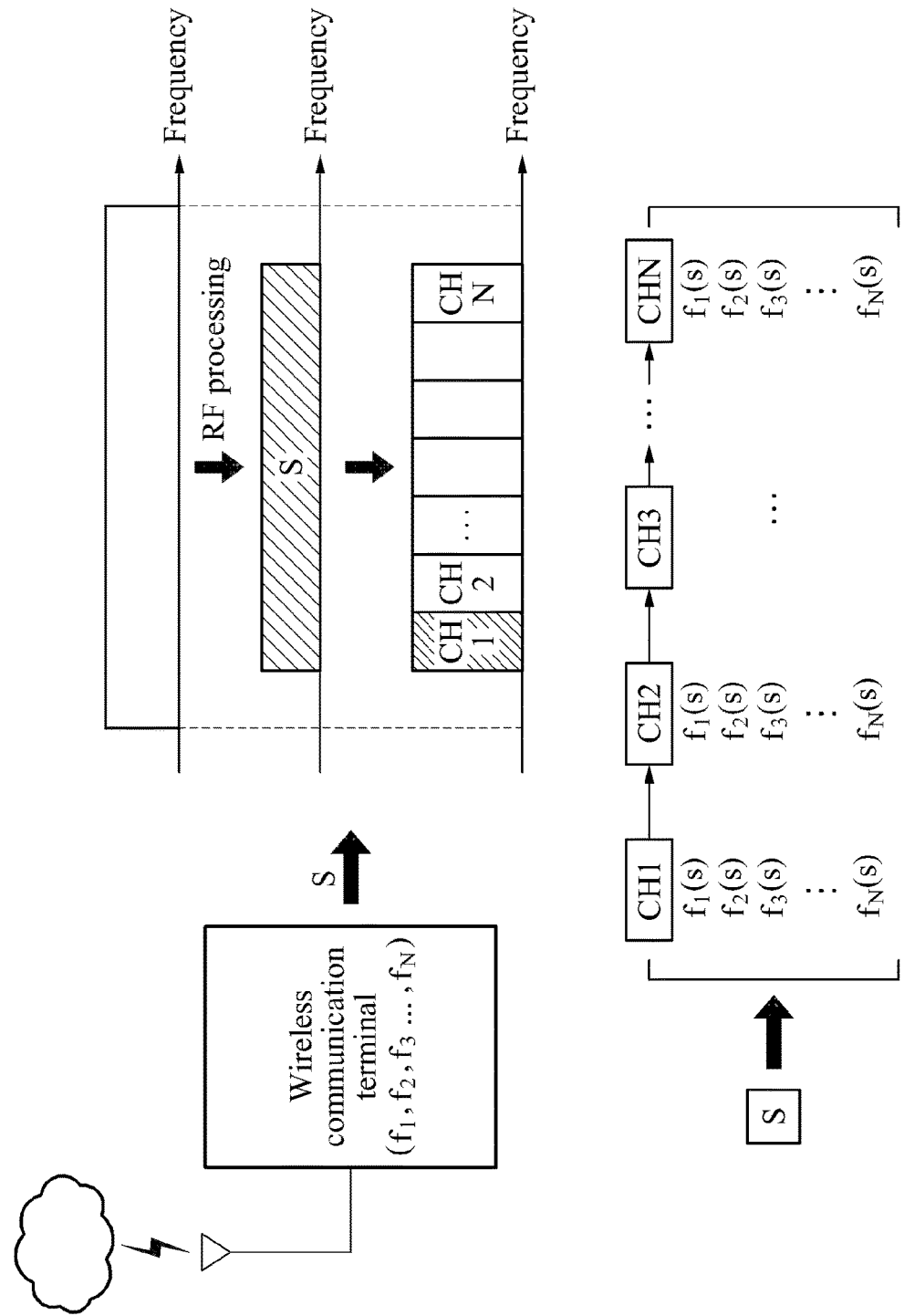
FIG. 4 is a diagram illustrating a procedure of detecting a feature of a wireless communication signal for each channel of a frequency band according to an example embodiment.

FIG. 4 is a diagram illustrating a procedure of detecting a feature of a wireless communication signal for each channel of a frequency band according to an example embodiment.

The wireless communication terminal may read features, for example, $f_1, f_2, f_3, \ldots,$ and $f_N$, of a wireless communication signal corresponding to at least one of a communication standard and a communication provider related to the wireless communication terminal, from a database included in the wireless communication terminal. When the communication standard differs, the feature may be determined differently. Also, when the communication provider differs, the feature may be determined differently although the communication standard is the same.

Additionally, the wireless communication terminal may receive a wireless communication signal, for example, S, from a predetermined communication network, and then detect whether a feature is present in the wireless communication signal. In this example, the wireless communication signal may be received through an antenna of the wireless communication terminal, and may be filtered based on a predetermined frequency band through a radio frequency (RF) processing. As illustrated in FIG. 4, a feature detection procedure of the wireless communication terminal may be performed on one channel among a plurality of channels, for example, CH1, CH2, . . . , and CHN, obtained by dividing a frequency band of the wireless communication signal based on a predetermined frequency interval.

Subsequently, the wireless communication terminal may detect features from a wireless communication signal for each channel. In FIG. 4, it is assumed that the wireless communication terminal reads a plurality of features, for example, $f_1, f_2, f_3, \ldots,$ and $f_N$, related to a communication standard and a communication provider to be processed. Depending on a case, the wireless communication terminal may read one feature corresponding to one of communication standards or communication providers.

The feature may include information on a channel and a frequency band used by the communication standard. When a feature is not detected from a wireless communication signal of a current channel, the wireless communication terminal may detect a feature from a wireless communication signal of a subsequent channel.

To this end, when the feature related to the communication standard is not detected from the current channel of the frequency band, the wireless communication terminal may detect the feature related to the communication standard in another channel by changing a frequency. The feature detection procedure may be performed repetitively, and may be suspended when the feature is detected.

When the feature is not detected from all channels of a predetermined frequency band, the wireless communication terminal may detect features from a wireless communication signal of another frequency band. In this example, when the wireless communication terminal reads one feature corresponding to one of the communication standards or communication providers, and when the feature is not detected from all of the channels and frequency bands, the wireless communication terminal may repetitively perform the procedure of FIG. 4 to detect a feature corresponding to a new communication standard or communication provider.

Also, when the feature is detected and the wireless communication terminal succeeds in finding a receivable communication network, the wireless communication terminal may set a modem based on a communication standard corresponding to the feature and perform wireless communication by accessing the communication network using the modem.

Figure 5:
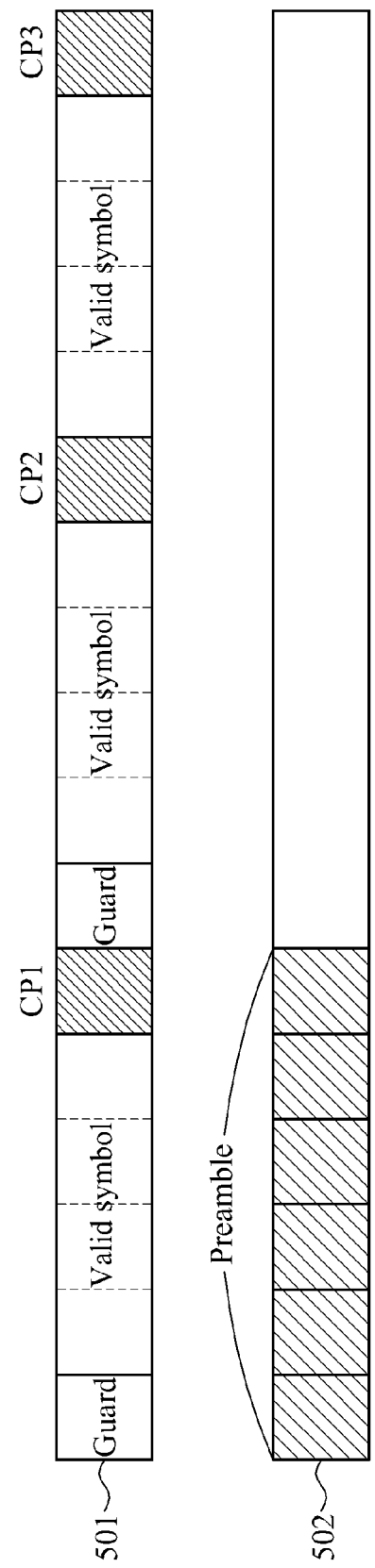
FIG. 5 is a diagram illustrating a feature of a wireless communication signal according to an example embodiment.

FIG. 5 is a diagram illustrating a feature of a wireless communication signal according to an example embodiment.

The wireless communication signal may include a feature, a common characteristic known irrespective of data to be transmitted based on a communication standard being used. Accordingly, the wireless communication terminal may detect a feature corresponding to a communication standard from a wireless communication signal received from an external source. The feature may include, for example, a pilot, a cyclic prefix of an OFDM signal, and a preamble included in a wireless local area network (WLAN) signal satisfying the standard related to 802.11.

Hereinafter, two types of features may be described with reference to FIG. 5. A wireless communication signal 501 may be an example of an OFDM signal, and may include a feature such as a cyclic prefix, for example, also referred to as CP, iterated at a predetermined interval. In the OFDM signal, a protection interval may be inserted prior to or following valid symbols, which are data to be actually transmitted, to avoid interference among the valid symbols, thereby removing interference to a delay signal having a delay shorter than a length of the protection interval. In this example, the cyclic prefix may be used as the protection interval.

Also, a wireless communication signal 502 may include a feature such as a preamble preceding data to be actually transmitted. In the preamble, a plurality of sequences provided in a predetermined size may be repetitively expressed. The preamble may be used for synchronization of a transmission timing in wireless communication, and include a sequence or a repetitive interval of which a length varies based on a communication standard.

The wireless communication terminal may detect a feature by receiving a wireless communication signal to search for an accessible communication network at a current position. In this example, the wireless communication terminal may be programmably implemented so as to detect the feature based on the communication standard.

In an example, the wireless communication terminal may perform a mathematical operation such as a cross-correlation, for example, a cross-correlator, to detect a sequence known in a time domain. Additionally, the wireless communication terminal may perform a mathematical operation such as an auto-correlation, for example, an auto-correlator, to detect the cyclic prefix, the pilot, the preamble, and the like provided repetitively. Also, the wireless communication terminal may perform a fast Fourier transform (FFT) for converting a wireless communication signal of the time domain into that of a frequency domain, to detect a feature included in the frequency domain. To detect the feature, the wireless communication terminal may read a feature corresponding to a communication standard from an internal database in advance.

Figure 6:
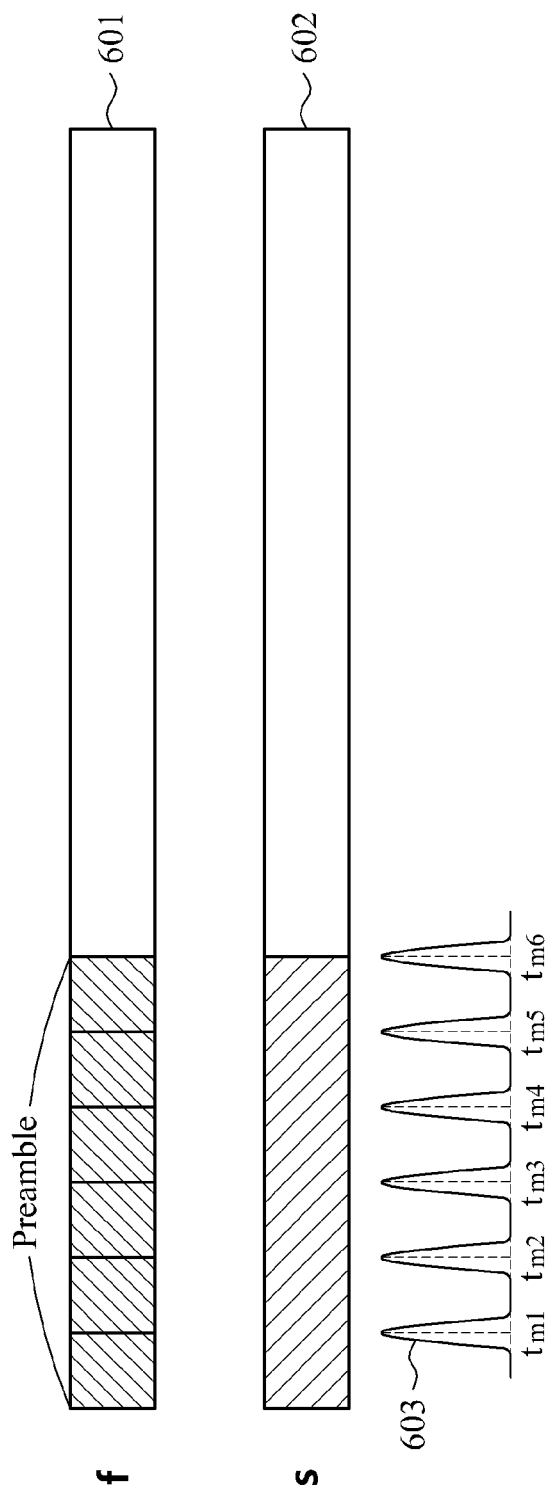
FIG. 6 is a diagram illustrating a procedure of detecting a feature of a wireless communication signal according to an example embodiment.

FIG. 6 is a diagram illustrating a procedure of detecting a feature of a wireless communication signal according to an example embodiment.

Referring to FIG. 6, a feature 601, for example, f, indicates a preamble including a repetitive sequence. A wireless communication terminal may read the feature 601 corresponding to a predetermined communication standard or communication provider from a database in advance. In this example, the wireless communication terminal may read a plurality of features corresponding to all communication standards and communication providers included in the database, or read a feature corresponding to one of communication standard or communication providers included in the database. A length of sequence, a number of sequences, a length of preambles, and the like may vary based on a communication standard and a communication provider.

Also, the wireless communication terminal may detect a feature from a wireless communication signal 602, for example, s. As an example, the wireless communication terminal may perform an auto-correlation on the wireless communication signal 602 and the feature 601. In this example, for each time, for example, $t_{m1}$ through $t_{m6}$, corresponding to a boundary of each sequence included in the preamble, a correlation value 603 greater than a preset threshold may be periodically obtained in a form of a peak. Subsequently, the wireless communication terminal may determine whether the feature is detected from the wireless communication signal in consideration of the correlation value 603 obtained in the form of peak. In this example, a repetition interval and a number of sequences may vary based on the auto-correlation scheme. Also, a correlation may be performed to obtain one peak having a relatively large size.

The wireless communication terminal may determine whether the correlation value 603 greater than the threshold is obtained in the current channel of the predetermined frequency band, to detect the feature from the wireless communication signal. When the correlation value 603 greater than the threshold is not obtained in the current channel with respect to the feature read from the database, the wireless communication terminal may detect the feature in another channel having a frequency different from that of the current channel. When the feature is not detected from all channels in the frequency band, the wireless communication terminal may repetitively perform the same procedure in another frequency band.

In this example, when the wireless communication terminal reads a feature corresponding to one of communication standards and communication providers, and when the feature is not detected from a wireless communication signal of all channels and frequency bands, the wireless communication terminal may repetitively perform the aforementioned procedure by reading a feature corresponding to a new communication standard or communication provider.

Figure 7:
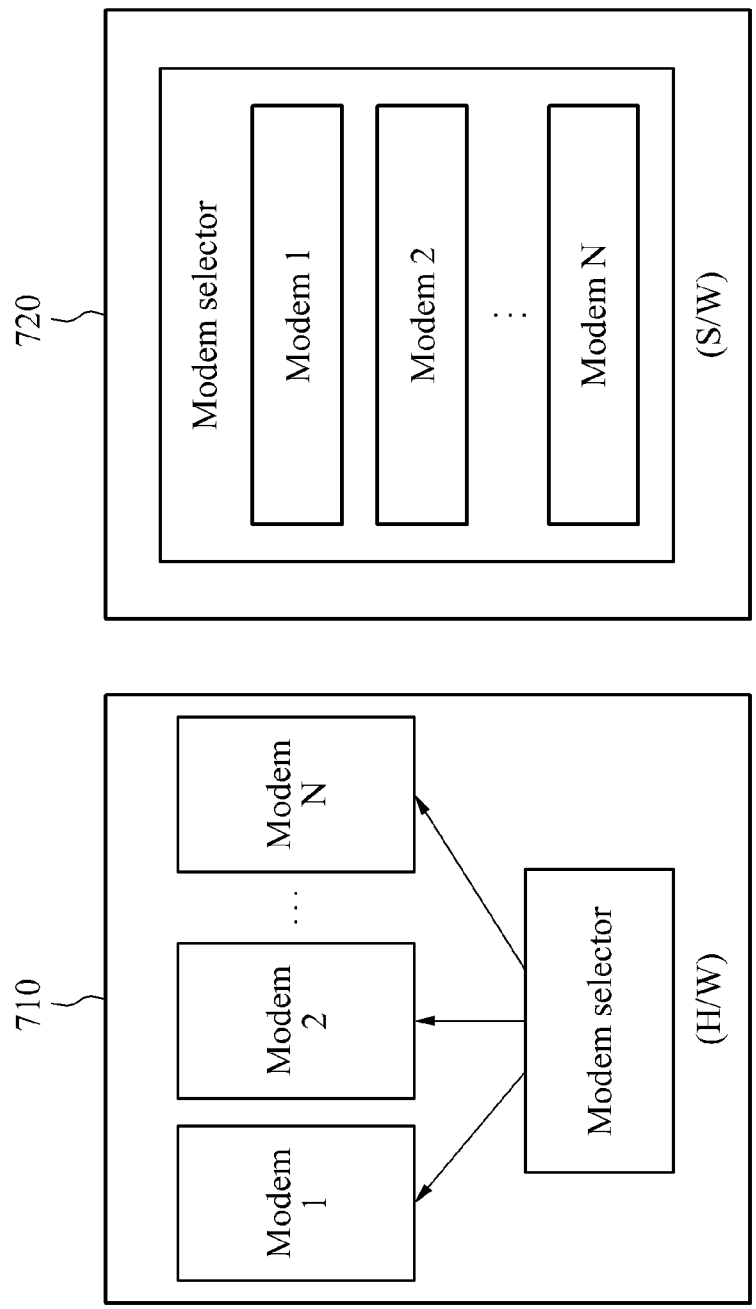
FIG. 7 is a diagram illustrating a procedure of selecting a modem related to a communication network according to an example embodiment.

FIG. 7 is a diagram illustrating a procedure of selecting a modem related to a communication network according to an example embodiment.

Referring to FIG. 7, a modem selector 701 may select one of a plurality of modems, for example, a modem 1 through a modem N, into which a current communication modem is classified through hardware. In this example, the modem selector 701 may select a modem based on a feature detected from a wireless communication signal. In this example, since the feature corresponds to a communication standard, the modem 1 through the modem N may be differently implemented based on the communication standard.

Also, in FIG. 7, a modem selector 702 may allow the current communication modem to be changed through software to perform the same function as the plurality of modems. When the feature is detected from the wireless communication signal, the modem selector 702 may change a program of the modem such that the modem matches a communication standard related to the feature.

According to the aforementioned example embodiments, in lieu of searching for all receivable communication networks, the wireless communication terminal may read, in advance, a feature related to a communication standard or a communication provider to recognize an accessible wireless communication network of a current position and then, detect the feature from a wireless communication signal received at a current position. Based on the detected feature, the wireless communication terminal may set a modem through hardware or software, thereby wirelessly communicating with a communication network. By using such a scheme, the wireless communication network accessible at the current position may be found more quickly, and an unnecessary mathematical operation may not be performed, which may lead to a reduction in power consumption of the wireless communication terminal.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A communication network setting method performed by a wireless communication terminal, the method comprising:
   reading a feature of a wireless communication signal related to at least one of a communication standard and a communication provider from a database of the wireless communication terminal;
   obtaining a correlation value between the feature and a wireless communication signal received at a current position of the wireless communication terminal;
   determining whether the feature is present in the wireless communication signal based on the correlation value;
   detecting, when the correlation value is greater than a threshold, the feature from the wireless communication signal;
   selecting a communication modem corresponding to the detected feature; and
   setting a communication network using the selected communication modem.

2. The method of claim 1, wherein the reading comprises reading a feature of a wireless communication signal including a cyclic prefix, a pilot, or a preamble included in the wireless communication signal based on the communication standard or the communication provider.

3. The method of claim 1, wherein the detecting comprises detecting a feature having a known common characteristic from the wireless communication signal based on the communication standard or the communication provider.

4. The method of claim 3, wherein the communication standard is a wireless communications protocol, and the communication provider is an entity which provides a wireless communications service.

5. The method of claim 1, wherein the detecting comprises performing at least one operation among a cross-correlation for detecting a recognized sequence, an auto-correlation for detecting repetitive information, and a frequency conversion for detecting a feature from a frequency domain.

6. The method of claim 1, wherein the detecting comprises detecting the feature from the wireless communication signal by changing a frequency band or changing a channel included in the frequency band until one of features corresponding to the communication standard or the communication provider read from the database is detected in the wireless communication signal received by the wireless communication terminal.

7. The method of claim 1, wherein the detecting comprises detecting, when a feature corresponding to the communication standard or the communication provider read from the database is not detected from the wireless communication signal received by the wireless communication terminal, the feature in the wireless communication signal by changing a frequency band or changing a channel included in the frequency band until the feature corresponding to the communication standard or the communication provider is detected, and
   detecting a feature corresponding to a new communication standard or communication provider when the feature is not detected from all frequency bands.

8. The method of claim 1, wherein the selecting comprises selecting a communication modem corresponding to the communication standard or the communication provider related to the feature from a plurality of communication modems implemented through hardware, or implementing a communication modem by changing a program through software based on the communication standard or the communication provider related to the feature.

9. The method of claim 1, wherein a feature corresponds to a characteristic that is mutually contained in each communication provider of plural communication providers, or a feature corresponds to a characteristic that is mutually contained in each communication standard of plural communication standards.

10. A wireless communication terminal performing a communication network setting method, the terminal comprising:
   a processing device configured to:
      read a feature of a wireless communication signal related to at least one of a communication standard and a communication provider from a database of the wireless communication terminal;
      obtain a correlation value between the feature and a wireless communication signal received at a current position of the wireless communication terminal;
      determine whether the feature is present in the wireless communication signal based on the correlation value;
      detect, when the correlation value is greater than a threshold, the feature from the wireless communication signal;
      select a communication modem corresponding to the detected feature; and
      set a communication network using the selected communication modem.

11. The terminal of claim 10, wherein the processing device is configured to read a feature of a wireless communication signal including a cyclic prefix, a pilot, or a preamble included in the wireless communication signal based on the communication standard or the communication provider.

12. The terminal of claim 10, wherein the processing device is configured to detect a feature having a known common characteristic from the wireless communication signal based on the communication standard or the communication provider.

13. The terminal of claim 10, wherein the processing device is configured to perform at least one operation among a cross-correlation for detecting a recognized sequence, an auto-correlation for detecting repetitive information, and a frequency conversion for detecting a feature from a frequency domain.

14. The terminal of claim 10, wherein the processing device is configured to detect the feature from the wireless communication signal by changing a frequency band or changing a channel included in the frequency band until one of features corresponding to the communication standard or the communication provider read from the database is detected in the wireless communication signal received by the wireless communication terminal.

15. The terminal of claim 10, wherein when a feature corresponding to the communication standard or the communication provider read from the database is not detected from the wireless communication signal received by the wireless communication terminal, the processing device is configured to detect the feature in the wireless communication signal by changing a frequency band or changing a channel included in the frequency band until the feature corresponding to the communication standard or the communication provider is detected, and
wherein when the feature is not detected from all frequency bands, the processing device is configured to detect a feature corresponding to a new communication standard or communication provider.

16. The terminal of claim 10, wherein the processing device is configured to select a communication modem corresponding to the communication standard or the communication provider related to the feature from a plurality of communication modems implemented through hardware, or implement a communication modem by changing a program through software based on the communication standard or the communication provider related to the feature.

17. The terminal of claim 10, wherein the processing device uses a mathematical operation performed by the communication modem to detect the feature of the wireless communication signal.

18. The terminal of claim 10, further comprising a memory configured to store instructions, wherein the processing device is configured to execute the instructions to configure the processing device to:
read the feature of a wireless communication signal related to the at least one of the communication standard and the communication provider from the database of the wireless communication terminal, and detect the feature from the wireless communication signal received at the current position of the wireless communication terminal;
select, when the feature is detected from the wireless communication signal using the read feature from the database, the communication modem corresponding to the detected feature; and
set the communication network using the selected communication modem.

\* \* \* \* \*